United States Patent
Elston

(10) Patent No.: US 6,299,775 B1
(45) Date of Patent: Oct. 9, 2001

(54) WASTE AND WASTEWATER TREATMENT AND RECYCLING SYSTEM

(76) Inventor: Clint R. Elston, 8274 90th La., Clear Lake, MN (US) 55139

( * ) Notice: Subject to any disclaimer, the term of this patent is extended or adjusted under 35 U.S.C. 154(b) by 0 days.

(21) Appl. No.: 09/527,839

(22) Filed: Mar. 17, 2000

(51) Int. Cl.[7] ................................. C02F 3/30; C02F 3/02
(52) U.S. Cl. ......................... 210/605; 210/613; 210/614; 210/621; 210/623; 210/629; 210/739; 210/741; 210/744; 210/97
(58) Field of Search ...................... 210/605, 613, 210/614, 621, 623, 629, 741, 739, 744, 97

(56) References Cited

U.S. PATENT DOCUMENTS

| | | |
|---|---|---|
| 3,797,667 * | 3/1974 | Rod . |
| 3,950,249 | 4/1976 | Eger et al. . |
| 4,196,082 | 4/1980 | Salokangas et al. . |
| 4,210,528 | 7/1980 | Coviello et al. . |
| 4,359,789 * | 11/1982 | Roberts . |
| 4,465,594 | 8/1984 | Laak . |
| 4,585,562 | 4/1986 | DeGraw et al. . |
| 4,812,237 | 3/1989 | Cawley et al. . |
| 5,114,586 * | 5/1992 | Humphrey . |
| 5,256,378 | 10/1993 | Elston . |
| 5,374,356 | 12/1994 | Miller et al. . |
| 5,498,330 | 3/1996 | Delle Cave . |
| 5,738,781 | 4/1998 | Carlson . |
| 5,868,937 * | 2/1999 | Back et al. . |

* cited by examiner

Primary Examiner—Chester T. Barry
(74) Attorney, Agent, or Firm—Dicke, Billig & Czaja, P.A.

(57) ABSTRACT

A waste and wastewater treatment and recycling system separates blackwater and greywater at their respective sources and includes a waste separation system for decomposing the blackwater into water vapor and carbon dioxide gas, a wastewater treatment system for circulating, aerating, and separating the greywater into precipitated solid matter and treated water, and a filtration, disinfection, and water recycling system for filtering and disinfecting the treated water to form recyclable water. The precipitated solid matter is transferred to the waste separation system and the recyclable water is passed through a membrane filtration system to form potable water. A monitoring system monitors and controls operation of the waste separation system, the wastewater treatment system, and the filtration, disinfection, and water recycling system.

20 Claims, 6 Drawing Sheets

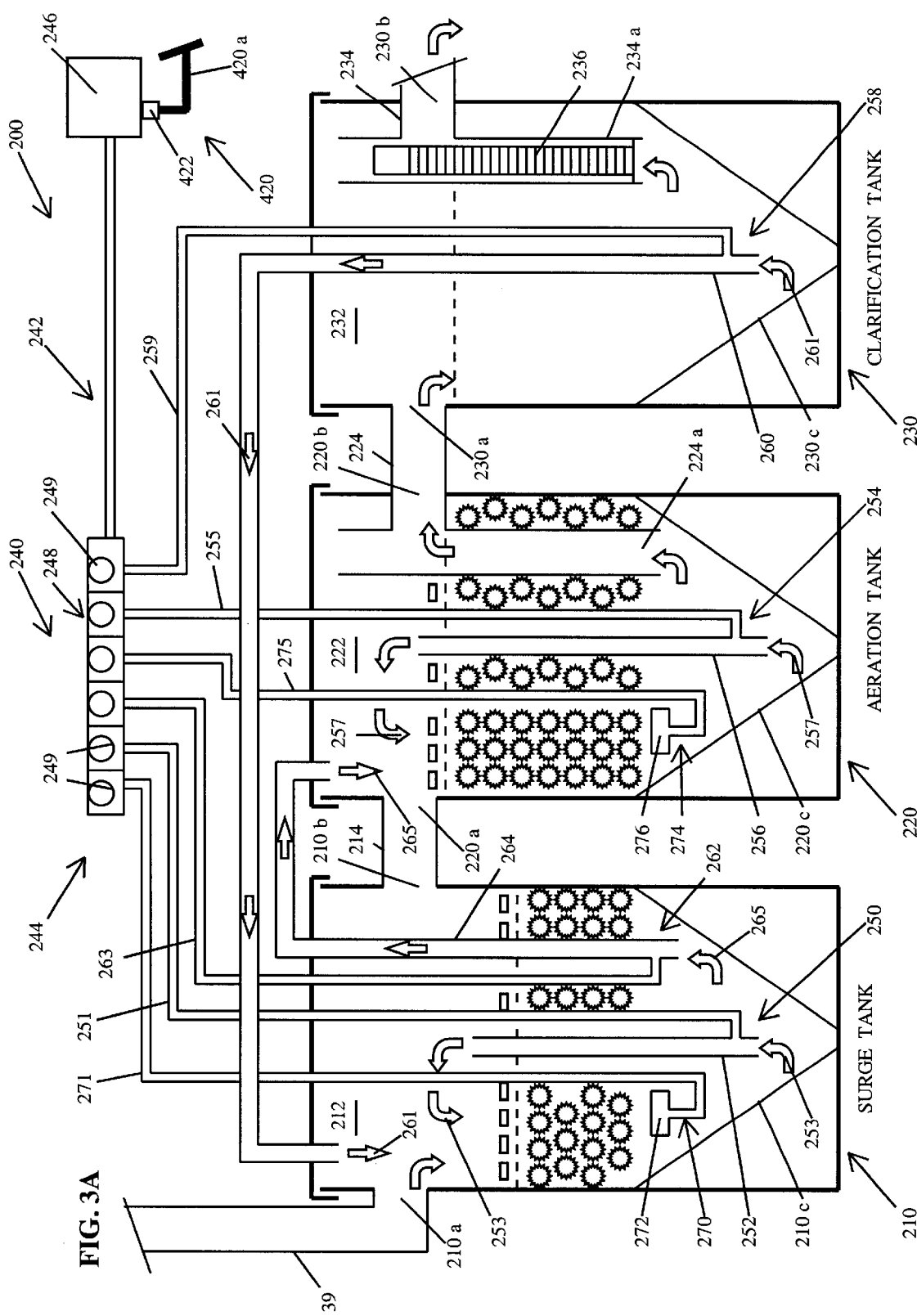

WASTE AND WASTEWATER TREATMENT AND RECYCLING SYSTEM

BACKGROUND OF THE INVENTION

The present invention relates generally to a system for treating and recycling waste and wastewater, and more particularly to a system which separates blackwater and greywater at their respective sources, decomposes and converts the blackwater into water vapor and carbon dioxide gas, circulates, aerates, and separates the greywater into precipitated solid matter and treated water, and filters and disinfects the treated water to form recyclable and potable water.

Wastewater generated by a household is typically classified as either blackwater or greywater. Blackwater includes water and organic waste drained from toilets and garbage disposals. Greywater includes wastewater drained from bathtubs, showers, sinks, clothes washers, and dishwashers. Typically, blackwater and greywater are plumbed into one single wastewater stream and directed to a septic or sewage system. By combining blackwater and greywater into one single wastewater stream, however, the entire wastewater stream must be treated as blackwater. Because water pollution and water availability have become increasingly important both nationally and internationally, numerous attempts have been made to treat organic waste and wastewater to acceptable levels and standards for reuse. Such attempts, however, have not produced environmentally benign and safe-for-recycle end-products.

Accordingly, a need exists for a system which separates blackwater and greywater at their respective sources and treats these two wastewater streams individually within separate processing systems to ensure that organic waste and wastewater from both streams are converted into environmentally benign and safe-for-recycle end-products.

SUMMARY OF THE INVENTION

One aspect of the present invention provides a waste and wastewater treatment and recycling system including a waste separation system, a wastewater treatment system, and a filtration, disinfection, and water recycling system. The waste separation system includes a compost chamber, an air inlet, an exhaust outlet, and at least one waste inlet communicating with the compost chamber, at least one agitator positioned within the compost chamber below the at least one waste inlet, and at least one conveyor positioned within the compost chamber below the at least one agitator. The wastewater treatment system includes a surge chamber, an aeration chamber, and a clarification chamber communicating in-line and providing a gravity flow therethrough, a wastewater inlet communicating with the surge chamber, and a sludge removal system communicating with the compost chamber of the waste separation system and at least one of the surge, aeration, and clarification chambers. The filtration, disinfection, and water recycling system includes a holding chamber, a treated wastewater inlet communicating with the holding chamber and the clarification chamber of the wastewater treatment system, a filter array communicating with and in-line after the holding chamber, a disinfection system communicating with and in-line after the holding chamber, and a reservoir communicating with and in-line after the disinfection system. In one embodiment, a monitoring system is operatively associated with at least one of the waste separation system, the wastewater treatment system, and the filtration, disinfection, and water recycling system.

Another aspect of the present invention provides a monitoring system for a waste and wastewater treatment and recycling system. The monitoring system includes a plurality of sensors operatively associated with at least one of the waste separation system, the wastewater treatment system, and the filtration, disinfection, and water recycling system, and a control unit operatively associated with the plurality of sensors. The control unit receives a plurality of input signals from the plurality of sensors, processes the input signals, and issues a plurality of command output signals to at least one of the waste separation system, the wastewater treatment system, and the filtration, disinfection, and water recycling system.

In one embodiment, the waste separation system includes a compost chamber, and at least one of the plurality of sensors monitors at least one of a temperature in the compost chamber, a quantity of airflow through the compost chamber, and an amount of liquid collected within the compost chamber. In one embodiment, the wastewater treatment system includes a surge chamber, an aeration chamber, and a clarification chamber communicating in-line, and at least one of the plurality of sensors monitors at least one of a level of water within the surge, aeration, and clarification chambers, and a quantity of dissolved oxygen within the surge, aeration, and clarification chambers. In one embodiment, the filtration, disinfection, and water recycling system includes a holding chamber, a filter array communicating with the holding chamber, a disinfection system communicating with the filter array, and a reservoir communicating with the disinfection system, and at least one of the plurality of sensors monitors at least one of a pressure of the filter array, operation of the disinfection system, and a level of water within at least one of the holding chamber and the reservoir.

Yet another aspect of the present invention provides a method of treating and recycling waste and wastewater including blackwater and greywater. The method includes the steps of transporting the blackwater to a waste separation system, decomposing the blackwater into water vapor and gas the waste separation system, transporting the greywater to a wastewater treatment system, circulating, aerating, and separating the greywater into precipitated solid matter and treated water within the wastewater treatment system, transferring the precipitated solid matter from the wastewater treatment system to the waste separation system, transferring the treated water from the wastewater treatment system to a filtration, disinfection, and water recycling system, and filtering and disinfecting the treated water within the filtration, disinfection, and water recycling system to form recyclable water. In one embodiment, the method further includes the steps of transferring the recyclable water to a membrane filtration system, and passing the recyclable water through the membrane filtration system to form potable water. In one embodiment, the method further includes the step of passing the potable water through a filter array including at least one of a microfilter and a charcoal filter. In one embodiment, the method further includes the step of monitoring at least one of the waste separation system, the wastewater treatment system, and the filtration, disinfection, and water recycling system.

BRIEF DESCRIPTION OF THE DRAWINGS

FIGS. 3A and 3B are schematic views of a wastewater treatment system of the waste and wastewater treatment and recycling system of FIG. 1;

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
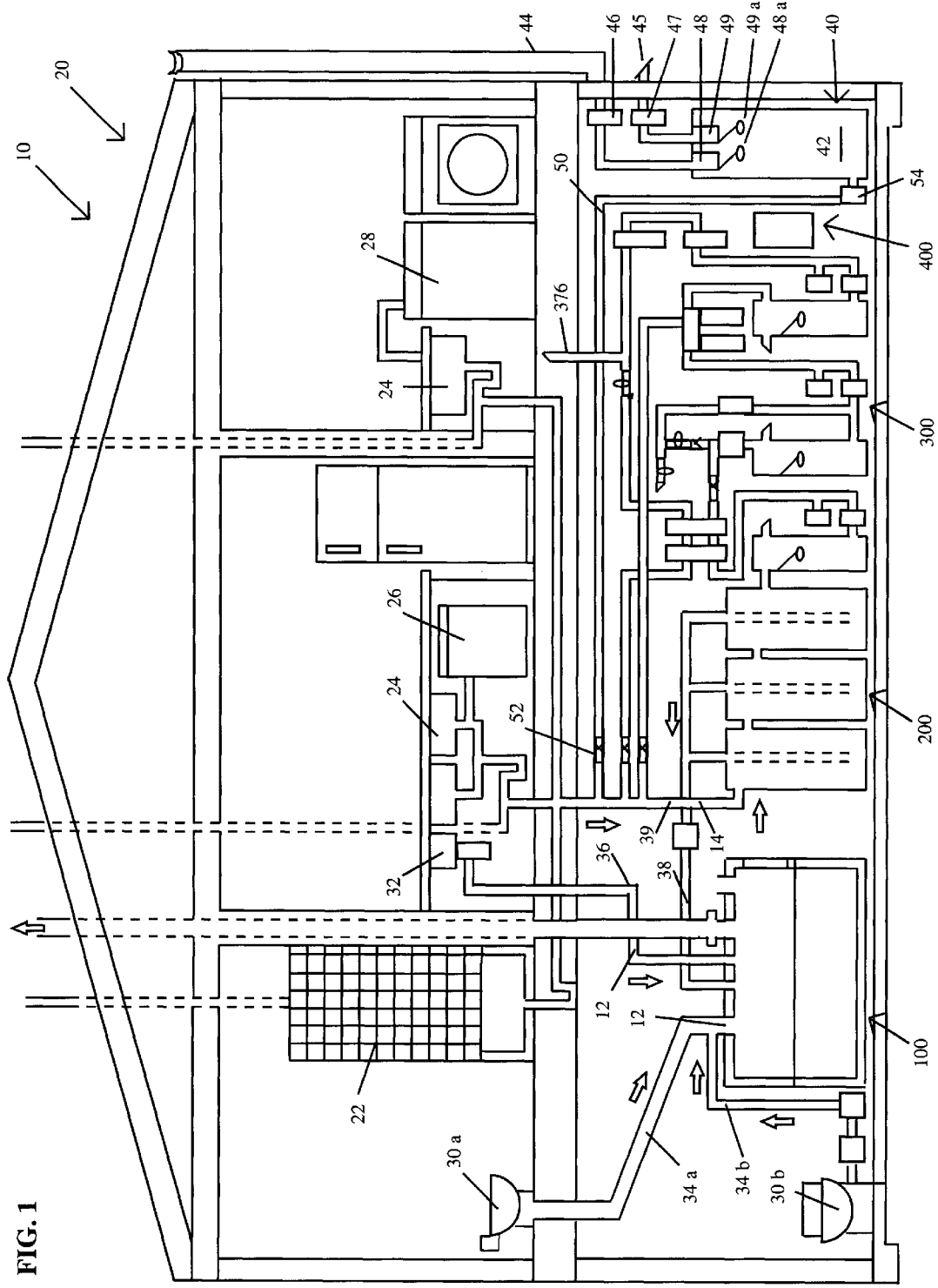
FIG. 1 is a schematic view of a waste and wastewater treatment and recycling system according to the present invention.

FIG. 1 illustrates one embodiment of a waste and wastewater treatment and recycling system 10 according to the present invention. System 10 includes a waste separation system 100, a wastewater treatment system 200, a filtration, disinfection, and water recycling system 300, and a monitoring system 400. System 10 separates, treats, and recycles organic waste 12 and wastewater 14, in the form of blackwater and greywater, respectively, into environmentally benign and safe-for-recycle end-products. Blackwater is defined to include human toilet and kitchen organic wastes, and greywater is defined to include wastewater which has been used for domestic activities such as personal hygiene, clothes washing, and dishwashing.

In one embodiment, system 10 is configured for use in a dwelling 20 which includes a first group of appliances which generate greywater and a second group of appliances which generate blackwater. The first group of appliances includes, for example, a bathtub and/or shower 22, a sink 24, a dishwashing machine 26, and a clothes washing machine 28. The second group of appliances includes, for example, toilets 30a and 30b, and a garbage disposal 32. As such, toilets 30a and 30b, and a garbage disposal 32 are plumbed separately from bathtub and/or shower 22, sink 24, dishwashing machine 26, and clothes washing machine 28. By separately plumbing the first group of appliances and the second group of appliances, blackwater and greywater are separated at each of their respective sources. Thus, system 10 does not commingle blackwater with greywater.

In an illustrative embodiment, toilets 30a and 30b utilize little or no water for flushing, and garbage disposal 32 incorporates a water-conserving faucet and sink arrangement. Toilet 30a, for example, is a waterless or low water-use gravity flush-type toilet and toilet 30b, for example, is a vacuum flush-type toilet. An example of toilet 30a is a Traveler 500, 900, or 2000 series toilet manufactured by SeaLand Technology, Inc. or a STW series Pearl Foam Flush-Type toilet manufactured by Nepon and an example of toilet 30b is a 500, 800, or 1000 series Vacu-Flush toilet manufactured by SeaLand Technology, Inc.

Since system 10 essentially establishes a closed-loop, zero discharge system, dwelling 20 includes a cistern 40 which forms a backup reservoir 42. Backup reservoir 42 supplies additional water to system 10 to makeup for water lost from drinking, cooking, toilet flushing, and/or delivery of organic waste 12 to waste separation system 100. In one embodiment, cistern 40 collects rainwater via conduit 44, and/or receives water from a well or municipal source via conduit 45. Pre-filters 46 and 47 are provided in conduits 44 and 45, respectively, for filtering the water before entering backup reservoir 42. Valves 48 and 49 are provided in conduits 44 and 45, respectively, for communicating conduits 44 and 45 with backup reservoir 42. Valves 48 and 49 each include a sensing device 48a and 49a, respectively, which senses a level of water within cistern 40 and opens or closes valves 48 and 49 accordingly. Cistern 40 communicates with wastewater treatment system 200 via a conduit 50 such that water from backup reservoir 42 is combined with wastewater 14. A check valve 52 is provided in conduit 50 to prevent backflow of water through conduit 50. A pump 54 communicates with conduit 50 and draws water from backup reservoir 42 to add water to the closed-loop, zero discharge system.

While system 10 is illustrated for use in dwelling 20, it is within the scope of the present invention for system 10 to be a self-contained system which is portable and/or capable of being buried in a vault. In addition, it is also within the scope of the present invention for system 10 to be used in marine and space environments wherein discharge of blackwater and/or greywater is not environmentally acceptable.

Figure 2:
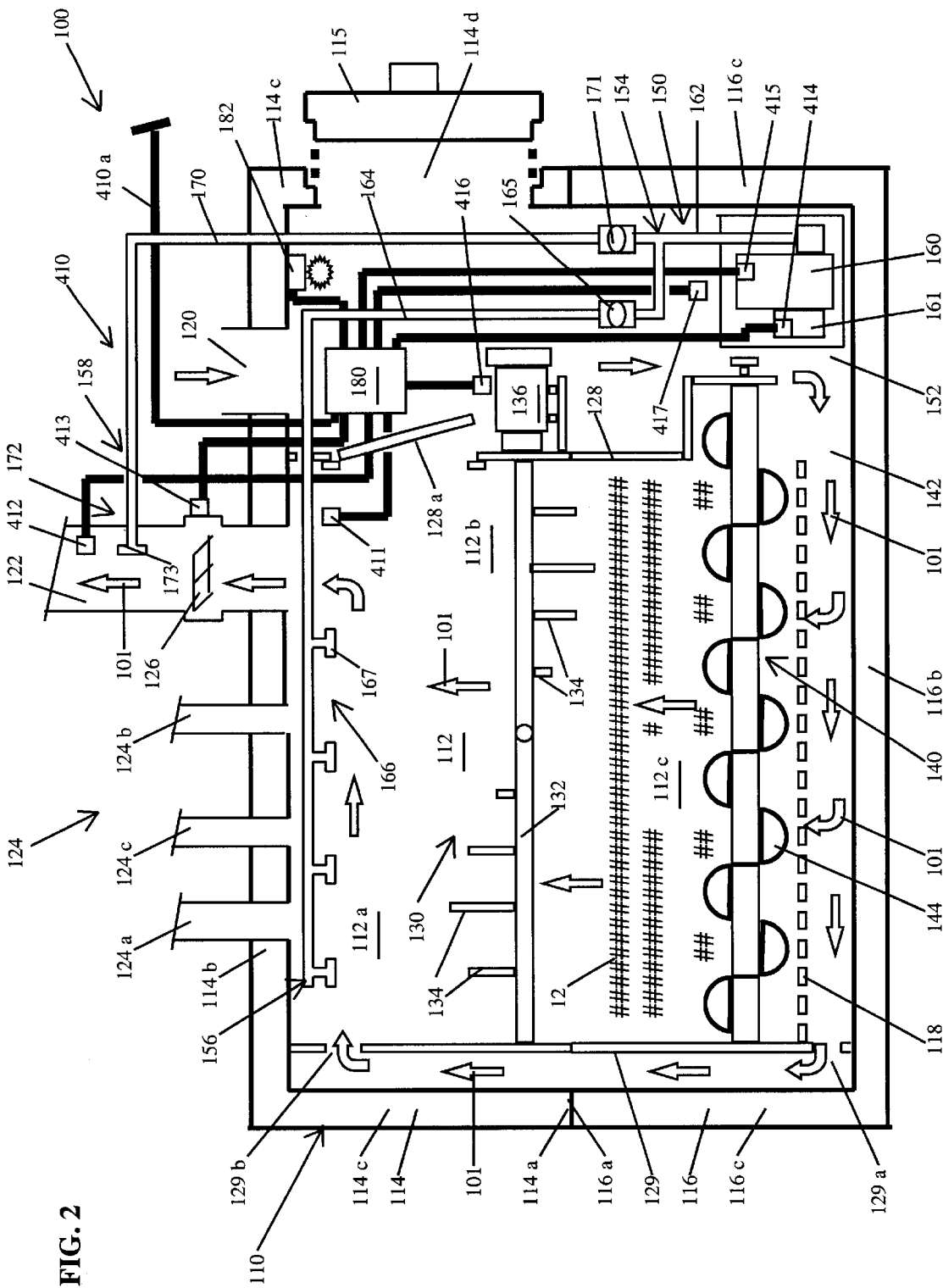
FIG. 2 is a schematic view of a waste separation system of the waste and wastewater treatment and recycling system of FIG. 1.

As illustrated in FIG. 2, waste separation system 100 includes a composting vessel 110, at least one organic waste agitator 130, at least one compost conveyor 140, and a liquid distribution system 150. Waste separation system 100 facilitates aerobic decomposition and composting of organic waste 12 transported thereto. Aerobic decomposition is defined to include decomposition in the presence of air and oxygen. In one embodiment, composting vessel 110 is a single or double-walled, insulated vessel and defines a compost chamber 112 which receives and decomposes organic waste 12 into primarily water vapor and carbon dioxide gas. In addition to water vapor and carbon dioxide gas, a relatively small volume of decomposed material, which can be readily handled, for example, as a garden fertilizer or the like, is also produced.

Compost chamber 112 includes an upper waste receiving volume 112a which receives organic waste 12, a central mixing and aeration volume 112b in which organic waste 12 is mixed and aerated, and a lower composting and compost collection volume 112c wherein decomposed material eventually settles. Organic waste 12 includes discharge from a variety of components, including toilets 30a and 30b, and garbage disposal 32, as well as other organic materials such as leaves, paper, garbage, and/or wood shavings or the like. It is, however, within the scope of the present invention for waste separation system 100 to handle biological waste materials from sources other than those enumerated.

In one embodiment, composting vessel 110 includes an upper section 114 and a lower section 116. Upper section 114 and lower section 116 are joined together at mating flanges 114a and 116a, respectively, to form compost chamber 112. Upper section 114 includes a top wall 114b and a pair of side walls 114c, and lower section 116 includes a bottom wall 116b and a pair of side walls 116c. One of the side walls 114c of upper section 114 has an opening 114d defined therein in which an openable and/or removable hatch 115 is fitted. Opening and/or removal of hatch 115 facilitates access to compost chamber 112 for maintenance, charging with bulk organic material, and/or removal of decomposed material. Formation of composting vessel 110 from upper and lower sections 114 and 116, respectively, facilitates transport and assembly. In addition, a size of upper and lower sections 114 and 116, respectively, varies depending primarily on an amount of organic waste 12 to be processed by system 10. While composting vessel 110 is illustrated as being of rectangular shape, it is within the scope of the present invention for composting vessel 110 to be cylindrical in shape.

In one embodiment, composting vessel 110 includes a perforated basket 118 suspended above bottom wall 116b of lower section 116 and spaced from sidewalls 116c of lower section 116. In one embodiment, perforated basket 118 includes a perforated floor 118a and perforated sidewalls (not shown). Perforated basket 118 facilitates aeration of organic waste 12 disposed within compost chamber 112 by permitting air to flow under, through, and around organic waste 12. Since perforated basket 118 is suspended within compost chamber 112, air circulation occurs throughout lower composting and compost collection volume 112c and central mixing and aeration volume 112b. In addition, water and/or other liquids accompanying organic waste 12 drain through perforated floor 118a to bottom wall 116b for removal by liquid distribution system 150, as described below.

Composting vessel 110 has an air inlet 120, an exhaust outlet 122 and at least one waste inlet 124 defined therein. Air inlet 120, exhaust outlet 122, and waste inlet 124 each communicate with compost chamber 112. In one embodiment, air inlet 120, exhaust outlet 122, and waste inlet 124 are each formed in top wall 114b of upper section 114. In addition, an exhaust fan 126 communicates with exhaust outlet 122. Furthermore, compost chamber 112 is divided by a front baffle 128 and a rear baffle 129 such that exhaust outlet 122 is separated from air inlet 120 by front baffle 128. Front baffle 128 is spaced from bottom wall 116b of lower section 116 to facilitate airflow thereunder. Front baffle 128 includes a door 128a which facilitates access to innermost portions of composting vessel 110, including upper waste receiving volume 112a and central mixing and aeration volume 112b. Rear baffle 129 has a lower opening 129a and an upper opening 129b defined therein which facilitate airflow therethrough.

Exhaust fan 126 draws air in air inlet 120, through compost chamber 112, and out exhaust outlet 122 such that air flows, as illustrated by arrows 101, along front baffle 128, under front baffle 128, through, under, and around perforated basket 118, through and under perforated floor 118a, through lower and upper openings 129a and 129b, respectively, and out exhaust outlet 122. As such, air flows beneath, around, and through lower composting and compost collection volume 112c, central mixing and aeration volume 112b, and upper waste receiving volume 112a to aerate compost chamber 112 and disperse water vapor and carbon dioxide gases generated within composting vessel 110 during decomposition to the atmosphere.

In one embodiment, waste inlet 124 includes a toilet waste inlet 124a, a kitchen waste inlet 124b, and a sludge inlet 124c. Toilet waste inlet 124a communicates with toilets 30a and 30b via conduits 34a and 34b (FIG. 1), respectively, kitchen waste inlet 124b communicates with garbage disposal 32 via a conduit 36 (FIG. 1), and sludge inlet 124c communicates with wastewater treatment system 200, as described below, via a conduit 38 (FIG. 1). While waste inlet 124 is illustrated as communicating with toilets 30a and 30b, and garbage disposal 32, it is within the scope of the present invention for any arrangement and/or number of sources to provide organic waste 12 to waste separation system 100. In addition, conduits 34a, 34b, 36, and 38, as well as all other conduits described herein, are preferably formed of polyvinylchloride (PVC), although it is within the scope of the present invention for various other natural and synthetic pipe compositions known to those skilled in the art to be employed.

Agitator 130 is positioned within compost chamber 112 below waste inlet 124 and upper waste receiving volume 112a in central mixing and aeration volume 112b. In one embodiment, agitator 130 is an elongated rod 132 which includes a plurality of tines 134 protruding radially therefrom. Tines 134 are spaced along a length of elongated rod 132 in an offset manner so as to be oriented in a noncoplanar arrangement around elongated rod 132. Elongated rod 132 is rotatably mounted within composting vessel 110 and rotated by a motor 136. As such, tines 134 agitate and mix organic waste 12 disposed within central mixing and aeration volume 112b of compost chamber 112. Such mixing facilitates aerobic biological decomposition of organic waste 12. While elongated rod 132 is illustrated as being rotated by motor 126, it is within the scope of the present invention for elongated rod 132 to be rotated by a hand.

Conveyor 140 is positioned within compost chamber 112 below agitator 130 and central mixing and aeration volume 112b in lower composting and compost collection volume 112c above perforated floor 118a. Conveyor 140 facilitates removal of decomposed material derived from organic waste 12 and collected within lower composting and compost collection volume 112c by transferring decomposed material to a compost collection area 142 formed along bottom wall 116b of lower section 116. In one embodiment, conveyor 140 is a screw-type auger 144 rotatably mounted within composting vessel 110. As such, auger 144 is rotated by, for example, a mechanical arrangement and/or hand, to transfer decomposed material collected within lower composting and compost collection volume 112c to compost collection area 142. Thereafter, decomposed material is removed from composting vessel 110 by access through opening 114d.

During selected uses, water and/or other liquids may be transported into compost chamber 112 through, for example, waste inlet 124. These liquids will tend to settle toward bottom wall 116b of lower section 116 and collect within a liquid collection area 152 formed along bottom wall 116b. Since perforated floor 118a is suspended above bottom wall 116b, perforated floor 118a allows liquid to pass through organic waste 12 to liquid collection area 152. As such, liquid distribution system 150 disperses and/or evaporates liquid collected within liquid collection area 152.

Liquid distribution system 150 includes a liquid circulation arrangement 154, a liquid dispersion system 156, and a liquid evaporation system 158. In one embodiment, liquid circulation arrangement 154 includes a pump 160 communicating with liquid collection area 152 and a distribution conduit 162 communicating with pump 160 to form a liquid distribution flow path. Pump 160 includes a sensing device 161 which activates and deactivates pump 160, according to a level of liquid collected within liquid collection area 152, to draw liquid from liquid collection area 152. While bottom wall 116b is illustrated as being flat, it is within the scope of the present invention for bottom wall 116b to include a slanted or recessed portion which directs liquid into liquid collection area 152 for dispersion and/or evaporation by liquid distribution system 150.

Liquid dispersion system 156 maintains a moist environment throughout compost chamber 112 so as to facilitate biological processes which lead to decomposition. In one embodiment, liquid dispersion system 156 includes a dispersion conduit 164 communicating with distribution conduit 162 and a dispersion arrangement 166 communicating with dispersion conduit 164. A valve 165 is provided in dispersion conduit 164 to selectively direct liquid through dispersion conduit 164 to dispersion arrangement 166. In one embodiment, dispersion arrangement 166 includes an aperture or a plurality of apertures in the form of a nozzle 167 which communicates with dispersion conduit 164. A plurality of apertures or nozzles 167 are positioned above agitator 130 and central mixing and aeration volume 112b so as to disperse collected liquid, under pressure, throughout upper waste receiving volume 112a and into central mixing and aeration volume 112b. Thus, liquid dispersion system 156 ensures that organic waste 12 does not dry out to an extent likely to inhibit decomposition.

Liquid evaporation system 158 dissipates liquid collected within liquid collection area 152. In one embodiment, liquid evaporation system 158 includes an evaporation conduit 170 communicating with distribution conduit 162 and an evaporation arrangement 172 communicating with evaporation conduit 170. A valve 171 is provided in evaporation conduit 170 to selectively direct liquid through evaporation conduit 170 to evaporation arrangement 172. In one embodiment, evaporation arrangement 172 includes an aperture or nozzle 173 communicating with evaporation conduit 170. Aperture or nozzle 173 communicates with exhaust outlet 122 so as to disperse collected liquid, under pressure, into exhaust outlet 122. Thus, dispersed liquid comes into contact and is carried out of composting vessel 110 with air that is drawn through exhaust outlet 122 by exhaust fan 126.

It is noted that relatively little water is to be used with waste separation system 100, and that large volumes of free-standing water are generally avoided in composting arrangements. Thus, liquid dispersion system 156 and liquid evaporation system 158 disperse and/or evaporate liquid that does collect within liquid collection area 152. Should an excessive amount of liquid collect within liquid collection area 152, liquid circulation arrangement 154 directs liquid outwardly from composting vessel 110.

In one embodiment, a control unit 180 controls operation of exhaust fan 126, motor 136 and agitator 130, and pump 160. It is, however, within the scope of the present invention for control unit 180 to also control conveyor 140 and valves 165 and 171. In addition, a service light 182 is provided within composting vessel 110.

Composting vessel 110 is initially charged with a large volume of wood shavings, soil, leaves, paper, and/or other organic material, including microbial material, for establishing decomposition. Over time, additional organic material is added to these initial charges through door 128a and from, for example, toilets 30a and 30b, and garbage disposal 32. After an extended period of time, during which there is an occasional mixing of composting material and/or addition of further nutrient and/or charging material to composting vessel 110 to facilitate aerobic processes therein, a substantial amount of substantially decomposed material collects in lower composting and compost collection volume 112c of compost chamber 112. After that time, and periodically from then on, conveyor 140 is operated to discharge decomposed material to compost collection area 142, wherefrom it is readily removed. In a typical operation with one toilet and one garbage disposal, initial operation of composting vessel 110 may be for several years before a first discharge operation is necessary. During such time, agitator 130 need only be turned gently every few months or so, for efficient operation.

Figure 3B:
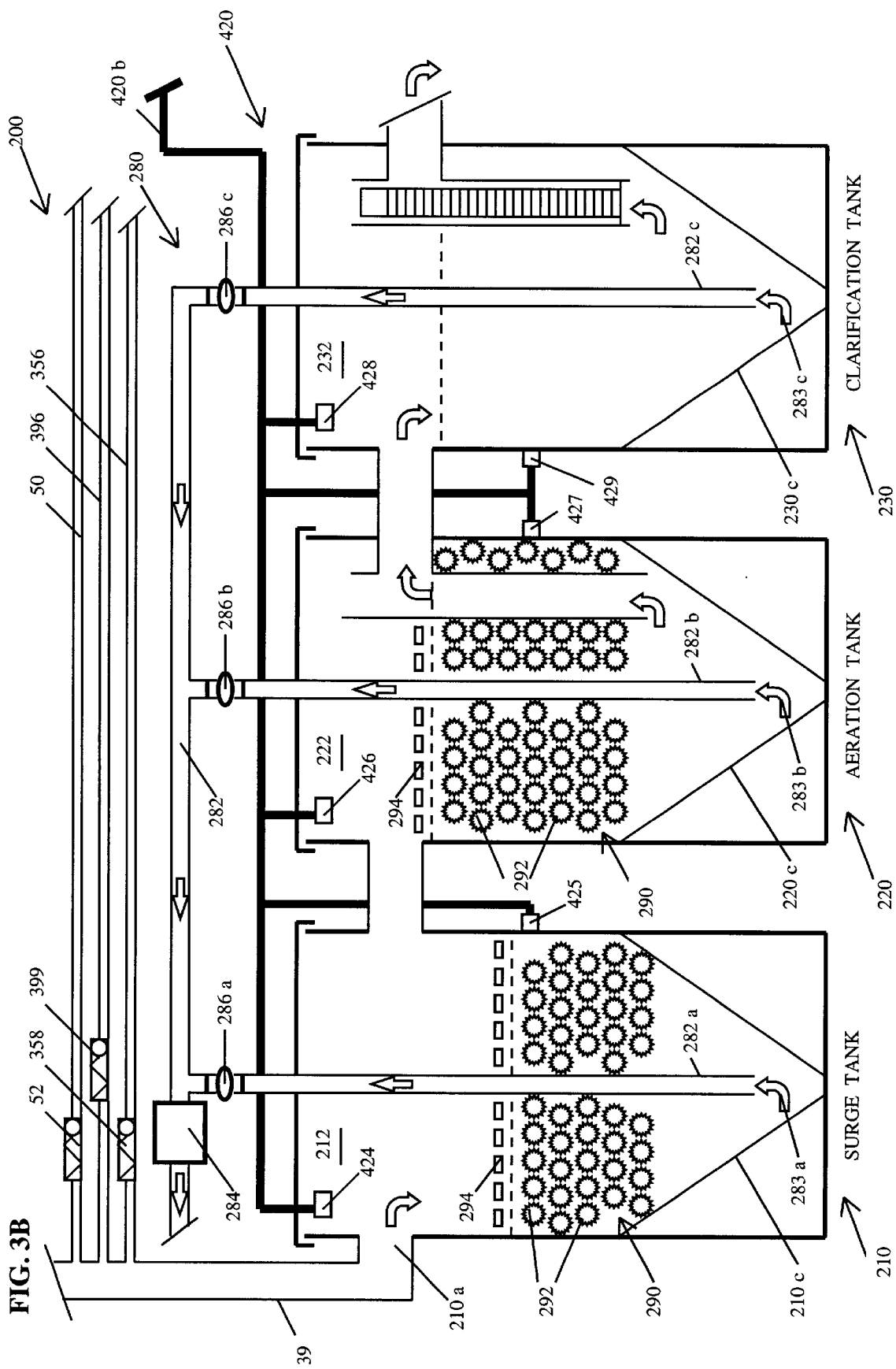

As illustrated in FIGS. 3A and 3B, wastewater treatment system 200 includes a surge tank 210, an aeration tank 220, a clarification tank 230, an extended aeration system 240, and a sludge removal system 280. Surge tank 210, aeration tank 220, and clarification tank 230 define a surge chamber 212, an aeration chamber 222, and a clarification chamber 232, respectively. In one embodiment, surge tank 210, aeration tank 220, and clarification tank 230 each have an inlet 210a, 220a, 230a, respectively, and an outlet 210b, 220b, 230b, respectively, defined therein. In addition, surge tank 210, aeration tank 220, and clarification tank 230 each have a sloped floor 210c, 220c, and 230c, respectively. It is, however, within the scope of the present invention for surge tank 210, aeration tank 220, and clarification tank 230 to each have a flat floor.

In one embodiment, inlet 210a of surge tank 210 communicates with a drain of bathtub and/or shower 22, a drain of sink 24, a drain of dishwashing machine 26, and a drain of clothes washing machine 28 via a conduit 39 (FIG. 1). Thus, inlet 210a constitutes a wastewater inlet of wastewater treatment system 200. Outlet 210b of surge tank 210 communicates with inlet 220a of aeration tank 220 via a conduit 214 and outlet 220b of aeration tank 220 communicates with inlet 230a of clarification tank 230 via a conduit 224. In addition, outlet 230b of clarification tank 230 communicates with filtration, disinfection, and water recycling system 300, as described below, via a conduit 234. Thus, outlet 230b constitutes a treated water outlet or effluent line of wastewater treatment system 200.

In one embodiment, surge tank 210, aeration tank 220, and clarification tank 230 communicate in-line so as to provide gravity flow of water therethrough. Thus, conduit 234 is positioned lower than conduit 224, conduit 224 is positioned lower than conduit 214, and conduit 214 is positioned lower than conduit 39. Conduit 224, however, includes an extension 224a extending downward into aeration chamber 222 to prevent direct through-flow of water between aeration tank 220 and clarification tank 230. In addition, conduit 234 includes an extension 234a extending downward into clarification chamber 232 to prevent direct through-flow of water between clarification tank 230 and filtration, disinfection, and water recycling system 300. In one embodiment, a filter 236 is provided in extension 234a to filter water passing through conduit 234 to filtration, disinfection, and water recycling system 300. An example of filter 236 is an A1800 filter manufactured by Zabel.

As illustrated in FIG. 3A, extended aeration system 240 includes an air delivery system 242 and an airflow array 244 for water circulation, distribution, and aeration within and amongst surge tank 210, aeration tank 220, and clarification tank 230. In one embodiment, air delivery system 242 includes a pump 246 and a valve arrangement 248. Pump 246 generates a supply of pressurized air and valve arrangement 248 includes a plurality of valves 249 which provide selective delivery and adjustment of pressurized air to airflow array 244. In one embodiment, airflow array 244 includes an airlift 250 communicating with surge chamber 212, an airlift 254 communicating with aeration chamber 222, an airlift 258 communicating with clarification chamber 232, and an airlift 262 communicating with surge chamber 212. In addition, airflow array 244 includes an air diffuser 270 communicating with surge chamber 212 and an air diffuser 274 communicating with aeration chamber 222. Airlifts 250, 254, 258, and 262, as well as air diffusers 270 and 274 are air assisted systems which facilitate water circulation, distribution, and aeration within and amongst surge tank 210, aeration tank 220, and clarification tank 230.

Airlifts 250, 254, 258, and 262 provide circulation and distribution of water within and amongst surge tank 210, aeration tank 220, and clarification tank 230. Airlift 250 includes an air delivery conduit 251 communicating with one of the valves 249 and an airlift conduit 252 communicating with air delivery conduit 251. Airlift conduit 252 extends into surge chamber 212 so as to draw water from a bottom portion of surge chamber 212 and redistribute the water to a top portion of surge chamber 212 as illustrated by arrows 253. Thus, airlift 252 circulates water contained within surge tank 210. Airlift 254 includes an air delivery conduit 255 communicating with one of the valves 249 and an airlift conduit 256 communicating with air delivery conduit 255. Air lift conduit 255 extends into aeration chamber 222 so as to draw water from a bottom portion of aeration chamber 222 and redistribute the water to a top portion of aeration chamber 222 as illustrated by arrows 257. Thus, airlift 254 circulates water contained within aeration tank 220. Airlift 258 includes an air delivery conduit 259 communicating with one of the valves 249 and an airlift conduit 260 communicating with air delivery conduit 259. Airlift conduit 260 extends into clarification chamber 232 so as to draw water from a bottom portion of clarification chamber 232 and redistribute the water to the top portion of surge chamber 212 as illustrated by arrows 261. Thus, airlift 258 returns settled solids back to surge tank 210 for additional treatment. Airlift 262 includes an air delivery conduit 263 communicating with one of the valves 249 and an airlift conduit 264 communicating with air delivery conduit 263. Airlift conduit 264 extends into surge chamber 212 so as to draw water from above the bottom portion of surge chamber 212 and redistribute the water to the top portion of aeration chamber 222 as illustrated by arrows 265. Thus, airlift 262 maintains a lower level of water in surge tank 210 than in aeration tank 220.

Air diffusers 270 and 274 provide aeration of water contained within surge tank 210 and aeration tank 220, respectively. Air diffuser 270 includes an air delivery conduit 271 communicating with one of the valves 249 and a diffuser head 272 provided at an end of air delivery conduit 271. Diffuser head 272 is submerged within surge chamber 212 so as to aerate water contained therein. Thus, air diffuser 270 provides oxygen for aerobic biological treatment of water contained within surge tank 210. Air diffuser 274 includes an air delivery conduit 275 communicating with one of the valves 249 and a diffuser head 276 provided at an end of air delivery conduit 275. Diffuser head 276 is submerged within aeration chamber 222 so as to aerate water contained therein. Thus, air diffuser 274 provides oxygen for aerobic biological treatment of water contained within aeration tank 220.

During circulation, distribution, and aeration of water within and amongst surge tank 210, aeration tank 220, and clarification tank 230, wastewater 14 separates into treated water and precipitated solid matter, in the form of sludge, which collects along a bottom portion of surge chamber 212, a bottom portion of aeration chamber 222, and a bottom portion of clarification chamber 232. Thus, sludge removal system 280 transfers sludge from surge tank 210, aeration tank 220, and clarification tank 230 to waste separation system 100 for decomposition.

As illustrated in FIG. 3B, sludge removal system 280 includes a conduit 282 which communicates with a bottom portion of surge chamber 212, a bottom portion of aeration chamber 222, and a bottom portion of clarification chamber 232 to transfer sludge from wastewater treatment system 200 to waste separation system 100. As such, conduit 282 includes a sludge pick-up 282a extending downward toward a center of sloped floor 210c of surge tank 210, a sludge pick-up 282b extending downward toward a center of sloped floor 220c of aeration tank 220, and a sludge pick-up 282c extending downward toward a center of sloped floor 230c of clarification tank 230. A pump 284 communicates with conduit 282 and draws sludge from the bottom portion of surge chamber 212 as illustrated by arrows 283a, the bottom portion of aeration chamber 222 as illustrated by arrows 283b, and the bottom portion of clarification chamber 232 as illustrated by arrows 283c. Valves 286a, 286b, and 286c are provided in sludge pick-ups 282a, 282b, and 282c, respectively, to selectively control removal of sludge from surge tank 210, aeration tank 220, and clarification tank 230. In one embodiment, conduit 282 communicates with sludge inlet 124c of composting vessel 110 (FIG. 2) to discharge sludge into upper waste receiving volume 112a of compost chamber 112 for decomposition.

In one embodiment, wastewater treatment system 200 includes a media 290 disposed within surge tank 210 and aeration tank 220. Media 290 is submerged within surge chamber 212 and aeration chamber 222 to provide additional surface area to support aerobic bacterial growth. In one embodiment, media 290 includes a plurality of balls 292 formed of porous plastic material. An example of media 290 is plastic packing manufactured by Jaeger under the tradename Tri-Packs™ or Lantec under the tradename Q-PAC™. In addition, wastewater treatment system 200 also includes a perforated member 294 positioned within surge tank 210 and aeration tank 220. Perforated member 294 is positioned above media 290 to disperse water circulated within surge chamber 212 and aeration chamber 222.

Figure 4:
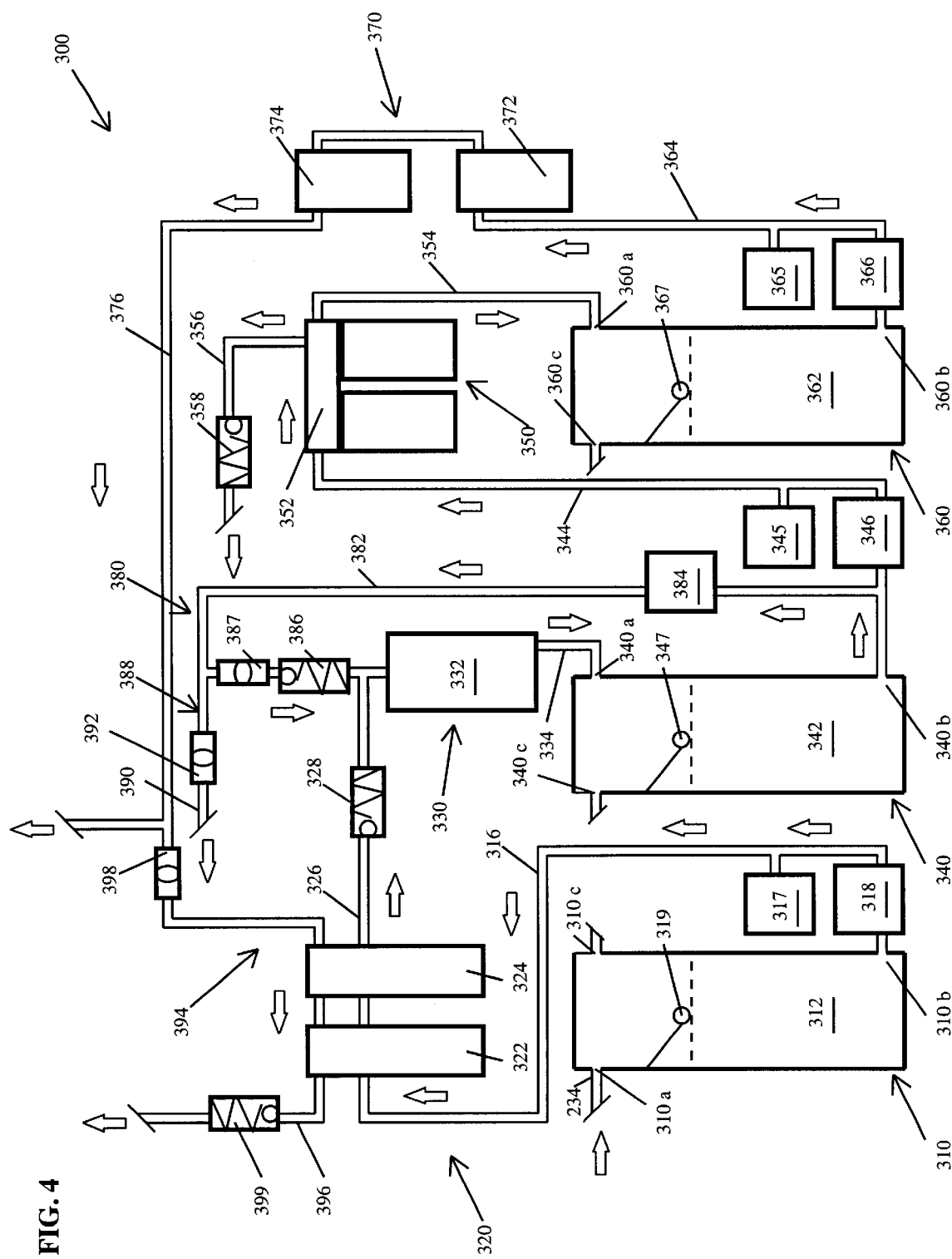
FIG. 4 is a schematic view of a filtration, disinfection, and water recycling system of the waste and wastewater treatment and recycling system of FIG. 1.

As illustrated in FIG. 4, filtration, disinfection, and water recycling system 300 includes a holding tank 310, a filter array 320, a disinfection system 330, a holding tank 340, a membrane filtration system 350, a holding tank 360, and a post-filter array 370. In one embodiment, filtration, disinfection, and water recycling system 300 also includes a continuous circulation system 380, a recyclable water discharge system 388, and a back flushing system 394.

Holding tank 310 defines a holding chamber 312 for treated water transferred from wastewater treatment system 200. Holding tank 310 includes an inlet 310a and an outlet 310b each communicating with holding chamber 312. Inlet 310a communicates with outlet 230b of clarification tank 230 via conduit 234 (FIG. 3A), and outlet 310b communicates with filter array 320 via a conduit 316. In one embodiment, a pump 318 communicates with conduit 316 and draws treated water from holding tank 310 in response to system demands. A sensing device 319 is disposed within holding tank 310 for sensing a level of treated water disposed therein. A pressure tank 317 communicates with conduit 316 for maintaining pressure and flow of treated water within conduit 316.

Filter array 320 is provided in-line after holding tank 310 for purifying treated water discharged from holding tank 310. In one embodiment, filter array 320 includes a sediment filter 322 and a viral and bacterial filter 324. Thus, sediment filter 322, and viral and bacterial filter 324 remove impurities for example, dirt and suspended solids, and cryptosporidium and giardia cysts, respectively, from treated water passing therethrough. In one illustrative embodiment, sediment filter 322 is a 20-micron filter, and viral and bacterial filter 324 is a 1-micron filter. An example of sediment filter 322 is a PP-BB-20-1 filter manufactured by Harmsco or a RDI ceramic filter manufactured by Marathon Ceramics and an example of viral and bacterial filter 324 is a PP-D-1 filter manufactured by Harmsco. Filter array 320 communicates with and supplies filtered water to disinfection system 330 via a conduit 326. A check valve 328 is provided in conduit 326 to prevent backflow of filtered water through conduit 326.

Disinfection system 330 is provided in-line after holding tank 310 and filter array 320 for disinfecting filtered water passed through filter array 320. In one embodiment, disinfection system 330 includes an ultra-violet light disinfection unit 332. Thus, disinfection unit 332 disinfects filtered water passing therethrough by subjecting the water to ultra-violet light. An example of disinfection unit 332 is an HS-10 Disinfection System manufactured by Germ Free Water, Inc. It is, however, within the scope of the present invention for disinfection system 330 to include an ozone or chlorine disinfection unit. Disinfection system 330 communicates with and supplies filtered and disinfected water to holding tank 340 via a conduit 334.

Holding tank 340 defines a holding chamber 342 for filtered and disinfected water. By filtering and disinfecting treated water, filter array 320 and disinfection system 330 produce recyclable water. As such, holding chamber 342 forms a reservoir for recyclable water. Holding tank 340 includes an inlet 340a and an outlet 340b each communicating with holding chamber 342. Inlet 340a communicates with conduit 334 leading from disinfection system 330 and outlet 340b communicates with membrane filtration system 350 via a conduit 344. In one embodiment, a pump 346 communicates with conduit 344 and draws filtered and disinfected water from holding tank 340 in response to system demands. A sensing device 347 is disposed within holding tank 340 for sensing a level of filtered and disinfected water disposed therein. A pressure tank 345 communicates with conduit 344 for maintaining pressure and flow of filtered and disinfected water within conduit 344.

Membrane filtration system 350 is provided in-line after holding tank 310, filter array 320, and disinfection system 330 for providing potable water. In one embodiment, membrane filtration system 350 includes a reverse osmosis unit 352 provided in-line after holding tank 340. Thus, reverse osmosis unit 352 provides potable water by forcing water through a membrane filter and removing salts and minerals. An example of reverse osmosis unit 352 is a WM-180-ROF reverse osmosis system manufactured by Premier. Membrane filtration system 350 communicates with holding tank 360 such that water that passes through reverse osmosis unit 352 is transferred to holding tank 360 via a conduit 354. Water that does not pass through reverse osmosis unit 352, however, is returned to surge tank 210 of wastewater treatment system 200 (FIG. 3B) via a bypass conduit 356 for dilution and treatment. A check valve 358 is provided in conduit 356 to prevent backflow of bypass water through conduit 356.

Holding tank 360 defines a holding chamber 362 for potable water. Holding tank 360 includes an inlet 360a and an outlet 360b each communicating with holding chamber 362. Inlet 360a communicates with conduit 354 leading from membrane filtration system 350 and outlet 360b communicates with post-filter array 370 via a conduit 364. In one embodiment, a pump 366 communicates with conduit 364 and draws potable water from holding tank 360 in response to system demands. A sensing device 367 is disposed within holding tank 360 for sensing a level of potable water disposed therein. A pressure tank 365 communicates with conduit 364 for maintaining pressure and flow of potable water within conduit 364.

Post-filter array 370 is provided in-line after membrane filtration system 350 and holding tank 360 for improving taste and removing odor from potable water discharged from holding tank 360. In one embodiment, post-filter array 370 includes a microfilter 372 and a charcoal filter 374. Thus, microfilter 372 and charcoal filter 374 remove, for example, sulfur and chlorine residual from potable water passing therethrough. An example of microfilter 372 is a PP-20-0.2-DOE filter manufactured by Harmsco and an example of charcoal filter 374 is a HC-90-AC-5 filter manufactured by Harmsco. In one embodiment, an output conduit 376 leading from post-filter array 370 communicates with and is adapted to supply potable water to, for example, toilets 30a and 30b, bathtub and/or shower 22, sink 24, dishwashing machine 26, and clothes washing machine 28.

In one embodiment, sensing device 319, disposed within holding tank 310, senses the level of treated water and activates pump 318 when the level exceeds a first predetermined level and activates pump 54 when the level falls below a second predetermined level. Sensing device 347, disposed within holding tank 340, senses the level of filtered and disinfected water and activates pump 384 when the level is above a predetermined level. Sensing device 367, disposed within holding tank 360, senses the level of potable water and activates pump 346 when the level falls below a predetermined level.

In one embodiment, holding tanks 310, 340, and 360 each include an overflow outlet 310c, 340c, and 360c, respectively. Thus, overflow outlets 310c, 340c, and 360c communicate with holding chambers 312, 342, and 362, respectively, and discharge overflow water.

In one embodiment, filtration, disinfection, and water recycling system 300 includes a continuous circulation arrangement 380. Continuous circulation arrangement 380 includes a circulation conduit 382 communicating with both holding tank 360 and disinfection system 330. A pump 384 communicates with circulation conduit 382 and draws filtered and disinfected water from holding tank 360 to provide continuous circulation of filtered and disinfected water through disinfection system 330. A check valve 386 is provided in circulation conduit 382 to prevent backflow of filtered and disinfected water through circulation conduit 382. A valve 387 is provided in circulation conduit 382 to selectively circulate filtered and disinfected water through circulation conduit 382. Valve 387 includes, for example, a manual valve or an automated valve.

In one embodiment, filtration, disinfection, and water recycling system 300 includes a discharge arrangement 388. Discharge arrangement 388 includes a discharge conduit 390 communicating with holding tank 360 (via circulation conduit 382). Pump 384 communicates with discharge conduit 390 (via circulation conduit 382) to draw filtered and disinfected water from holding tank 360. A valve 392 is provided in discharge conduit 390 to selectively discharge filtered and disinfected water through discharge conduit 390. Valve 392 includes, for example, a manual valve or an automated valve.

In one embodiment, filtration, disinfection, and water recycling system 300 includes a back flushing system 394. Back flushing system 394 includes a back flushing conduit 396 communicating with output conduit 376. Back flushing conduit 396 communicates with filter array 320 for reverse flow therethrough. As such, back flushing conduit 396 communicates in-line with viral and bacterial filter 324 and sediment filter 322. A valve 398 is provided in back flushing conduit 396 before filter array 320 to selectively discharge potable water through back flushing conduit 396. Valve 398 includes, for example, a manual valve or an automated valve. In addition, a check valve 399 is provided in back flushing conduit 396 after filter array 320 to prevent backflow of water to filter array 320. Back flushing conduit 396 communicates with inlet 210a of surge tank 210 via conduit 39 (FIG. 3B) to discharge backflushing water into wastewater treatment system 200.

As illustrated in FIGS. 2, 3A, 3B, and 5, monitoring system 400 monitors and/or controls operation of waste separation system 100, operation of wastewater treatment system 200, and operation of filtration, disinfection, and water recycling system 300. As such, monitoring system 400 includes a plurality of sensors 410 monitoring operation of waste separation system 100, a plurality of sensors 420 monitoring operation of wastewater treatment system 200, and a plurality of sensors 430 monitoring operation of filtration, disinfection, and water recycling system 300. In addition, monitoring system 400 includes a control unit 450 which receives input signals from sensors 410, 420, and 430, processes the input signals, and issues command output signals to waste separation system 100, wastewater treatment system 200, and filtration, disinfection, and water recycling system 300, accordingly.

In one embodiment, as illustrated in FIG. 2, sensors 410 which monitor operation of waste separation system 100 include a sensor 411 for monitoring a temperature in compost chamber 112, a sensor 412 for monitoring a quantity of airflow through exhaust outlet 122, a sensor 413 for monitoring operation of exhaust fan 126, a sensor 414 for monitoring cycling of pump 160, a sensor 415 for monitoring operation of pump 160, a sensor 416 for monitoring operation of motor 136, and a sensor 417 for monitoring an amount of liquid collected within composting vessel 110. Signals from sensors 411, 412, 413, 414, 415, 416, and 417 are input to control unit 450 via a signal line 410a.

In one illustrative embodiment, sensor 411 measures temperature and humidity within compost chamber 112, sensor 412 measures cubic feet per minute (cfm) of air movement, sensor 413 measures electrical current consumed and potential malfunction of exhaust fan 126, sensor 414 measures number of cycles pump 160 was turned on and potential malfunction of sensing device 161, sensor 415 measures electrical current consumed and potential malfunction of pump 160, sensor 416 measures electrical current consumed and potential malfunction of motor 136, and sensor 417 measures high water level and potential malfunction of pump 160 and/or sensing device 161.

In one embodiment, as illustrated in FIGS. 3A and 3B, sensors 420 which monitor operation of wastewater treatment system 200 include a sensor 422 for monitoring operation of pump 246, a sensor 424 for monitoring a level of water in surge tank 210 a sensor 425 for monitoring a quantity of dissolved oxygen in surge tank 210, a sensor 426 for monitoring a level of water in aeration tank 220 a sensor 427 for monitoring a quantity of dissolved oxygen in aeration tank 220, a sensor 428 for monitoring a level of water in clarification tank 230, and a sensor 429 for monitoring a quantity of dissolved oxygen in clarification tank 230. A signal from sensor 422 is input to control unit 450 via a signal line 420a and signals from sensors 424, 425, 426, 427, 428, and 429 are input to control unit 450 via a signal line 420b.

In one illustrative embodiment, sensor 422 measures electrical current consumed and potential malfunction of air compressor 246, sensors 424, 426, and 428 measure high water level, and sensors 425, 427, and 429 measure dissolved oxygen levels.

Figure 5:
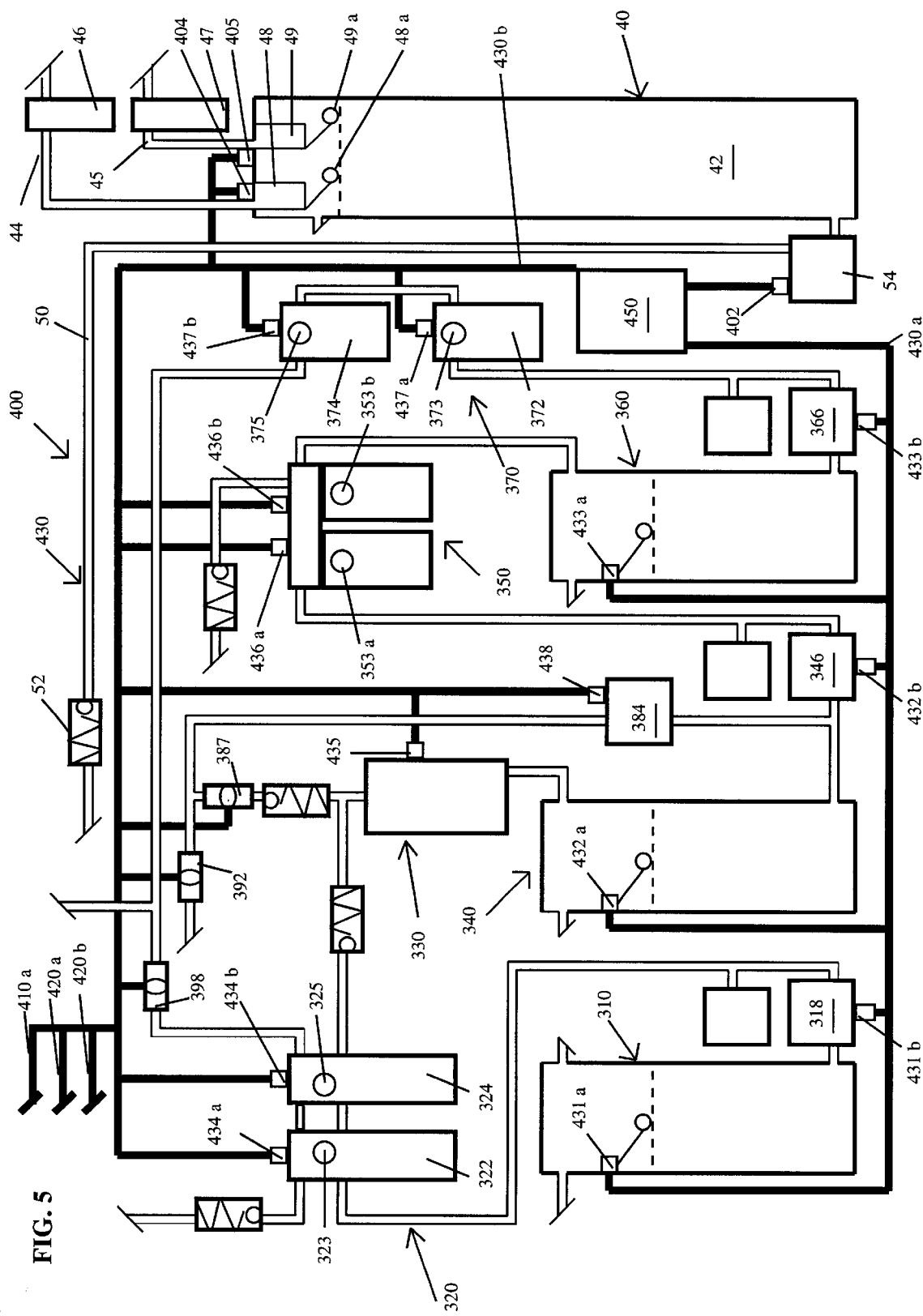
FIG. 5 is a schematic view of a monitoring system of the waste and wastewater treatment and recycling system of FIG. 1.

In one embodiment, as illustrated in FIG. 5, sensors 430 which monitor operation of filtration, disinfection, and water recycling system 300 include a sensor 431a for monitoring a level of water within holding tank 310, a sensor 431b for monitoring operation of pump 318, a sensor 432a for monitoring a level of water within holding tank 340, a sensor 432b for monitoring operation of pump 346, a sensor 433a for monitoring a level of water within holding tank 360, and a sensor 433b for monitoring operation of pump 366. Signals from sensors 431a, 431b, 432a, 432b, 433a, and 433b are input to control unit 450 via a signal line 430a. Sensors 430 also include a sensor 434a for monitoring a pressure gauge 323 of sediment filter 322, a sensor 434b for monitoring a pressure gauge 325 of viral and bacterial filter 324, a sensor 435 for monitoring operation of disinfection system 330, a sensor 436a for monitoring a pressure gauge 353a of membrane filtration system 350, a sensor 436b for monitoring a pressure gauge 353b of membrane filtration system 350, a sensor 437a for monitoring a pressure gauge 373 of microfilter 372, a sensor 437b for monitoring a pressure gauge 375 of charcoal filter 374, and a sensor 438 for monitoring operation of pump 384. Signals from sensors 434a, 434b, 435, 436a, 436b, 437a, 437b, and 438 are input to control unit 450 via a signal line 430b.

In one illustrative embodiment, sensor 431a measures liquid level and number of cycles pump was turned on, sensor 431b measures electrical current consumed and potential malfunction of pump 318, sensor 432a measures liquid level and number of cycles pump was turned on, sensor 432a in the high position would open valve 392 and turn on pump 384 if water is to be discharged instead of being directed to membrane filtration system 350, sensor 432b measures electrical current consumed and potential malfunction of pump 346, sensor 433a measures liquid level and number of cycles pump was turned on, sensor 433b measures electrical current consumed and potential malfunction of pump 366, and sensors 434a and 434b measure pressure after filters 322 and 324, respectively, and determine when pressure drops below a prescribed amount from pressure at tank 310 to turn off pump 318, open valve 398 for predetermined time to back flush the system, close valve 398, and then turn pump 318 back on. In addition, sensor 436a measures pressure after a first filter of membrane filtration system 350 and determines when pressure drops below line pressure from pressure at tank 340 and pump 346 indicating a need to remove and change the first filter, sensor 436b measures pressure after a second filter of membrane filtration system 350 and determines when pressure drops below line pressure from pressure at tank 340 and pump 346 indicating a need to remove and change the second filter, sensor 437a measures pressure after filter 372 and determines when pressure drops below line pressure from pressure at tank 360 and pump 366 indicating a need to remove and change filter 372, sensor 437b measures pressure after filter 374 and determines when pressure drops below line pressure from pressure at tank 360 and pump 366 indicating a need to remove and change filter 374, and sensor 438 measures electrical current consumed and potential malfunction of pump 384.

In addition, control unit 450 receives signals from a sensor 402 which monitors operation of pump 54, a sensor 404 which monitors operation of valve 48, and a sensor 405 which monitors operation of valve 49. In addition, control unit 450 receives signals indicative of a position of valves 387, 392, and 398.

In one illustrative embodiment, sensor 402 measures electrical current consumed and potential pump malfunction, sensor 404 measures flow and water level in reservoir 42 from roof water supply system, and sensor 405 measures flow and water level in reservoir 42 from city or well water supply system.

Control unit 450 receives input signals from sensors 410, 420, 430, 402, 404, and 405, and input signals indicative of valve positions. Thus, control unit 450 processes the input signals and monitors various parameters of waste separation system 100, wastewater treatment system 200, and filtration, disinfection, and water recycling system 300. In response to system demands, including system malfunctions, control unit 450 issues command output signals to waste separation system 100, wastewater treatment system 200, and filtration, disinfection, and water recycling system 300, accordingly. In one embodiment, control unit 450 communicates with a central monitoring and processing center (not shown). As such, control unit 450 is monitored and receives operational commands from the central monitoring and processing center. An example of control unit 450 is Tele-Controller Monitoring System manufactured by QuadTech.

In operation, waste and wastewater treatment and recycling system 10 separates blackwater and greywater at each of their respective sources and treats these two wastewater streams individually. For example, toilets 30a and 30b, and a garbage disposal 32 are plumbed separately from bathtub and/or shower 22, sink 24, dishwashing machine 26, and clothes washing machine 28. As such, blackwater is transported to waste separation system 100 and greywater is transported to wastewater treatment system 200. Within waste separation system 100, blackwater is decomposed into water vapor and carbon dioxide gas. Within wastewater treatment system 200 greywater is circulated, aerated, and separated into precipitated solid matter and treated water. Thereafter, precipitated solid matter is transferred from wastewater treatment system 200 to waste separation system 100 for decomposition and treated water is transferred from wastewater treatment system 200 to filtration, disinfection, and water recycling system 300. Within filtration, disinfection, and water recycling system 300, treated water is filtered and disinfected to form recyclable and potable water. In addition, monitoring system 400, monitors and controls operation of waste separation system 100, wastewater treatment system 200, and filtration, disinfection, and water recycling system 300.

Thus, waste and wastewater treatment and recycling system 10 essentially establishes a closed-loop, zero discharge waste and wastewater treatment and recycling system. As such, waste separation system 100 employs aerobic and/or vermiculture decomposition processes to decompose human toilet and kitchen organic wastes 12, wastewater treatment system 200 treats and separates wastewater 14, filtration, disinfection, and water recycling system 300 filters, disinfects, stores, and delivers upon demand potable water for entire reuse including cooking, drinking, and personal hygiene, and monitoring system 400 monitors, documents, controls, and shuts down system 10 in response to system demands and/or malfunctions.

By separating blackwater and greywater at each of their respective sources, and then transporting and treating these two wastewater streams individually within separate processing systems, the present invention ensures that organic wastes and wastewater from both streams are converted to environmentally benign and safe-for-recycle end-products. To ensure that the separate processing systems operate appropriately, a monitoring system collects data, controls operations, reports any operational discrepancies, and shuts down the processing systems in case of a malfunction.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention.

What is claimed is:

1. A method of treating and recycling waste and wastewater including blackwater and greywater, the method comprising the steps of:

transporting the blackwater to a waste separation system;

decomposing the blackwater into water vapor and gas within the waste separation system;

transporting the greywater to a wastewater treatment system;

circulating, aerating, and separating the greywater into precipitated solid matter and treated water within the wastewater treatment system, including circulating and aerating the greywater within a surge chamber, transferring water from the surge chamber to an aeration chamber, circulating and aerating water within the aeration chamber, transferring water from the aeration chamber to a clarification chamber, and filtering water from the clarification chamber to form the treated water;

transferring the precipitated solid matter from the wastewater treatment system to the waste separation system;

transferring the treated water from the wastewater treatment system to a filtration, disinfection, and water recycling system; and filtering and disinfecting the treated water within the filtration, disinfection, and water recycling system to form recyclable water.

2. The method of claim 1, further comprising the steps of:

transferring the recyclable water to a membrane filtration system; and passing the recyclable water through the membrane filtration system to form potable water.

3. The method of claim 2, further comprising the step of:

passing the potable water through a filter array including at least one of a microfilter and a charcoal filter.

4. The method of claim 1, further comprising the step of:

monitoring at least one of the waste separation system, the wastewater treatment system, and the filtration, disinfection, and water recycling system.

5. The method of claim 4, wherein the step of monitoring at least one of the waste separation system, the wastewater treatment system, and the filtration, disinfection, and water recycling system includes monitoring at least one of a temperature within the waste separation system, a quantity of airflow through the waste separation system, and an amount of liquid collected within the waste separation system.

6. The method of claim 4, wherein the step of monitoring at least one of the waste separation system, the wastewater treatment system, and the filtration, disinfection, and water recycling system includes monitoring at least one of a level of water within the wastewater treatment system and a quantity of dissolved oxygen within the wastewater treatment system.

7. The method of claim 4, wherein the step of monitoring at least one of the waste separation system, the wastewater treatment system, and the filtration, disinfection, and water recycling system includes monitoring at least one of a pressure of the filtration, disinfection, and water recycling system, and a level of water within the filtration, disinfection, and water recycling system.

8. The method of claim 1, wherein the step of decomposing the blackwater includes agitating the blackwater within a compost chamber, drawing gas into and through the compost chamber, and exhausting gas out of the compost chamber.

9. The method of claim 8, wherein the step of decomposing the blackwater includes at least one of dispersing and evaporating liquid collected within the compost chamber.

10. The method of claim 1, wherein the step of circulating, aerating, and separating the greywater further includes re-circulating water from the clarification chamber to the surge chamber.

11. The method of claim 1, wherein the step of filtering and disinfecting the treated water includes passing the treated water through a filter array including at least one of a sediment filter and a viral and bacterial filter, and passing the treated and filtered water through a disinfection system.

12. The method of claim 1, further comprising the step of:

backflushing the filtration, disinfection, and water recycling system into the wastewater treatment system.

13. A method of treating and recycling waste and wastewater including blackwater and greywater, the method comprising the steps of:

transporting the blackwater to a waste separation system;

decomposing the blackwater into water vapor and gas within the waste separation system;

transporting the greywater to a wastewater treatment system;

circulating, aerating, and separating the greywater into precipitated solid matter and treated water within the wastewater treatment system;

transferring the precipitated solid matter from the wastewater treatment system to the waste separation system;

transferring the treated water from the wastewater treatment system to a filtration, disinfection, and water recycling system;

filtering and disinfecting the treated water within the filtration, disinfection, and water recycling system to form recyclable water; and backflushing the filtration, disinfection, and water recycling system into the wastewater treatment system.

14. The method of claim 13, further comprising the steps of:

transferring the recyclable water to a membrane filtration system; and passing the recyclable water through the membrane filtration system to form potable water.

15. The method of claim 14, wherein the step of backflushing the filtration, disinfection, and water recycling system includes backflushing the filtration, disinfection, and water recycling system with the potable water.

16. The method of claim 13, wherein the step of circulating, aerating, and separating the greywater includes circulating and aerating the greywater within a surge chamber, transferring water from the surge chamber to an aeration chamber, circulating and aerating water within the aeration chamber, transferring water from the aeration chamber to a clarification chamber, re-circulating water from the clarification chamber to the surge chamber, and filtering water from the clarification chamber to form the treated water.

17. The method of claim 13, wherein the step of filtering and disinfecting the treated water includes passing the treated water through a filter array including at least one of a sediment filter and a viral and bacterial filter, and passing the treated and filtered water through a disinfection system.

18. The method of claim 17, wherein the step of backflushing the filtration, disinfection, and water recycling system includes backflushing the filter array into the wastewater treatment system.

19. The method of claim 13, further comprising the step of:

monitoring the filtration, disinfection, and water recycling system, including monitoring at least one of a pressure of the filtration, disinfection, and water recycling system, and a level of water within the filtration, disinfection, and water recycling system.

20. The method of claim 19, wherein the step of monitoring the filtration, disinfection, and water recycling system includes monitoring the pressure of the filtration, disinfection, and water recycling system, and wherein the step of backflushing the filtration, disinfection, and water recycling system includes backflushing the filtration, disinfection, and water recycling system when the pressure is less than a prescribed amount.

\* \* \* \* \*